Patented Oct. 24, 1922.

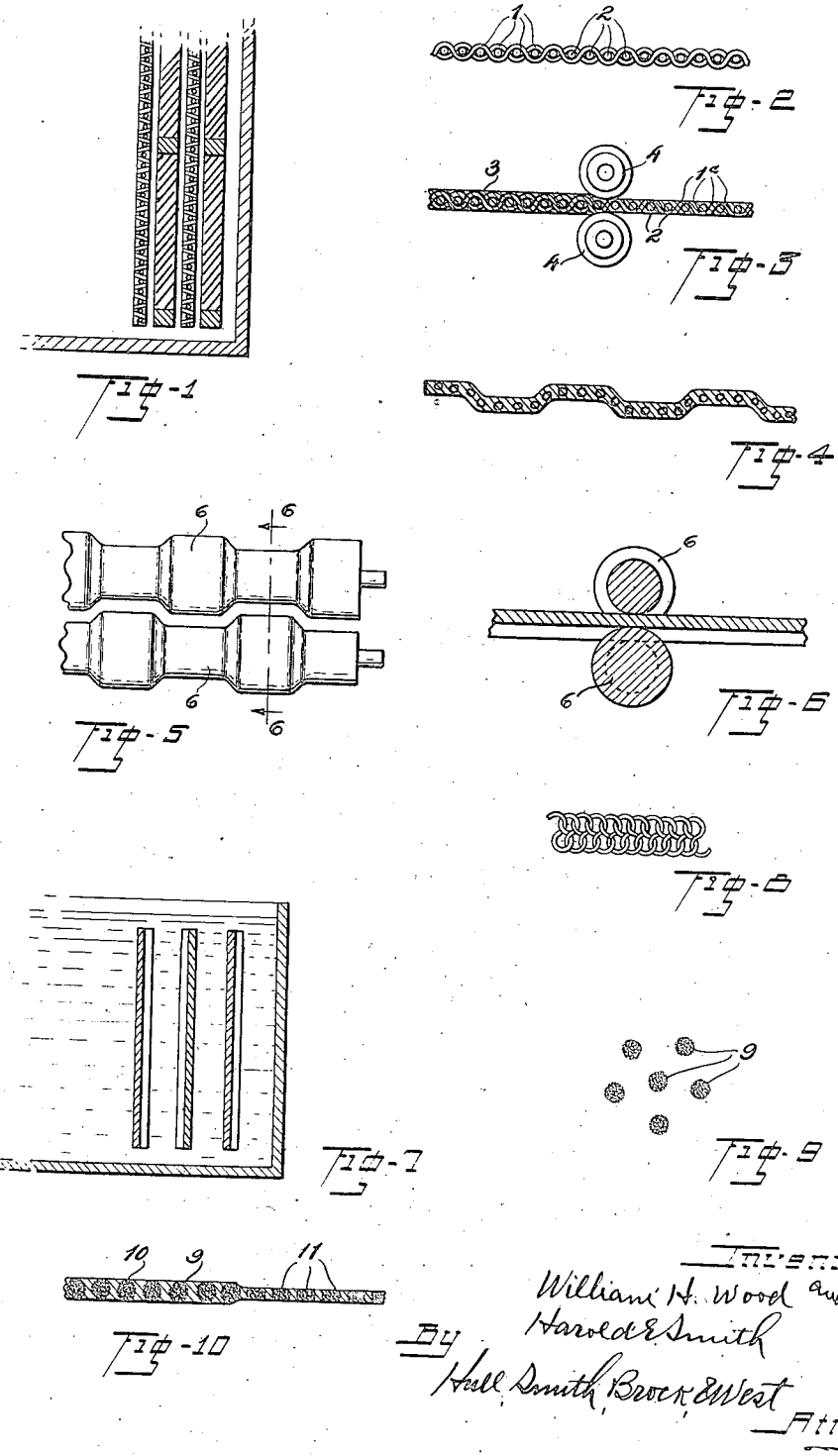

1,432,938

UNITED STATES PATENT OFFICE.

WILLIAM H. WOOD, OF SOUTH EUCLID, AND HAROLD E. SMITH, OF CLEVELAND HEIGHTS, OHIO; SAID SMITH ASSIGNOR TO SAID WOOD.

BATTERY SEPARATOR.

Application filed February 9, 1920. Serial No. 357,461.

*To all whom it may concern:*

Be it known that we, WILLIAM H. WOOD and HAROLD E. SMITH, citizens of the United States, residing, respectively, at South Euclid and Cleveland Heights, in the county of Cuyahoga and State of Ohio, have invented a certain new and useful Improvement in Battery Separators, of which the following is a full, clear, and exact description, reference being had to the accompanying drawings.

This invention relates to storage batteries and particularly to the spacing plates or "separators" whereby the active electrodes are spaced apart and maintained out of contact with each other. Numerous substances have been employed for these plates, chiefly wood of some kind, sometimes chemically treated to remove or destroy obnoxious ingredients. Another type of separator has been made of rubber cast around great numbers of fibrous vegetable threads which traverse the same from side to side, the latter being left permanently in the rubber sheet so as to produce small wicks.

Both of these separators offer the disadvantage of slow deterioration under the action of sulphuric acid, which acts slowly to dissolve the cellulose content, and which acts upon the separator with rapidity whenever the same is subsequently exposed to the air. By this means the wooden separators become eaten away and carbonized long before the life of the plates themselves has been expended; and while the rubber type of separator is longer lived than the wood still if exposed for a short time to the atmosphere it becomes so extremely tender and brittle as to break at a touch. These rubber separators, even as heretofore employed, have proven far superior to the wooden separators in that they possess a greater porosity coupled with a thinner dimension, by reason of which the internal resistance of the batteries is greatly decreased and it becomes possible to develop a given power output with a much smaller battery, which is a very important consideration.

The objects of our invention are the provision of an improved process of producing battery separators which shall be more rapid and less expensive than any process heretofore used and which shall result in a superior separator both as regards strength, porosity, and freedom from deterioration; the improvement of the process of producing existing separators whereby certain defects therein can be overcome; the provision of a new, improved and strengthened separator; while further objects and advantages of our invention will become apparent as the description proceeds.

The essence of our invention consists in the employment with the rubber separators of a mixture of soluble and insoluble flexible threads. The soluble threads are preferably of a porous and wicklike nature and are best made of vegetable fibers, cotton being the most convenient; while the insoluble threads are preferably made of animal fibers such as wool or hair which is highly resistant to the effect of sulphuric acid in any strength used in storage batteries. The effect of the last named insoluble threads is to reinforce and strengthen the plate and prevent it from falling to pieces under the action of the electrolyte, even when concentrated by evaporation, which purpose it serves even though the vegetable fibers become eaten entirely away by the acid.

In the drawings accompanying and forming a part of this application we have shown certain embodiments of our said invention together with certain steps of one process whereby our improved separators are made. In these drawings Fig. 1 illustrates a portion of a storage battery containing our improvements; Fig. 2 is an enlarged cross-sectional view of one type of base fabric which we may employ in making the separators; Fig. 3 illustrates a step in the production of our improved separators; Fig. 4 illustrates the same separator after the corrugating step; Fig. 5 is a face view of the finishing rolls employed after the corrugating step; Fig. 6 is a sectional view of the same showing the finishing step in process of performance; Fig. 7 represents the pickling step; Fig. 8 represents one of the many modified forms of fabric which can be employed within our invention; Fig. 9 represents still another form in which the fibrous material can be introduced; and Fig. 10 illustrates a partially worked blank in which the last mentioned material is employed.

In the formation of our improved separators, instead of employing single threads as heretofore, laid independently and at great expense of time and labor, we preferably employ threads previously incorporated into an organized form, preferably a fabric which may either be netted as shown in Fig. 2 or knitted as indicated in Fig. 8. In either case the fibers which are to traverse the plate and constitute the wicks are preferably laid loosely and at a large angle to the face of the fabric. This condition is highly characteristic particularly of knitted goods, and when a knitted fabric is used as shown in Fig. 2 it is preferable to employ one in which the strands which lie in one direction as shown at 1, 1, are so loose as to pursue an extremely sinuous course, so as to traverse and retraverse the web nearly perpendicularly; while the other strands shown at 2 lie nearly straight throughout the length so as ultimately to be submerged completely in the body of the plate. Furthermore the first named strands are preferably made of a substance which shall be very largely eaten out during the pickling process and before the plate is put into battery use, while the latter strands are preferably made of a substance which either naturally or by impregnation resists the action of the pickling bath and electrolyte thus giving strength to the plate instead of becoming a source of weakness. It is entirely immaterial to our invention which of these be the warp and which the woof, although under customary methods of manufacture the first-named, loosely-laid threads are ordinarily laid as the woof and the second mentioned straighter threads constitute the warp. The first named threads are preferably made of an almost pure cellulose, as for example cotton, either raw or mercerized; and the latter threads are preferably made of wool or other hair which resists sulphuric acid.

Whatever the nature of the fabric, it is first treated with a composition of such character as shall penetrate all interstices between threads, but shall not unduly wet and soak into the separate threads, and shall then become hard and comparatively rigid. This is generally a rubber composition but we do not restrict ourselves thereto. Also when rubber is employed we prefer to apply it otherwise than with a carbon dioxide reagent which has a direct affinity for cotton, and rather work the rubber into the fabric by heat and pressure, and if any solvent or softening reagent is employed, to use something like benzene which does not so much tend to carry the rubber into such intimate relation with the cellulose fibers. The result of this coating produces a plate as shown at 3 in Fig. 3 having the fabric totally submerged. This sheet is then fed between cutting or grinding rollers 4—4 whereby the surface portions are removed together with a considerable portion of each of the threads 1, thereby producing a multitude of little wicks having ends at 1ª, 1ª but leaving the threads 2—2 still completely submerged.

It is perfectly possible to pickle the plate at this point and employ the same without corrugation, but we prefer to corrugate it by passing it next through heated rollers whereby it is given the sectional character shown in Fig. 4. This action of the heated rolls, however, serves to some extent to smear the rubber over the ends of the wicks, and this is true whether the wicks are produced and inserted as heretofore described or in any other way; and to overcome this disadvantage we next pass the plates between corrugated abraiding rollers 6—6 shown in Figs. 5 and 6, the same being covered with particles of garnet, quartz, emery, carborundum or other cutting substance whereby the surface portions are again loosened up.

The plates are next inserted in a cold solution of sulphuric acid of a specific gravity at least about 1.4 and preferably upwards of 1.5, for example about 1.6. The result of this treatment is with greater or less rapidity depending upon the strength of the solution to dissolve the cellulose content of the wicks, thereby increasing the porosity of the plate, and as a result it is not only possible to obtain a more active separating plate than heretofore, but to do so with the use of a smaller amount of wick material thereby producing a plate of greater strength; and by reason of the pickling in advance of use in a battery, the plate is aged and brought to a stable condition so that its deterioration in the battery is greatly decreased.

After the pickling has proceeded sufficiently far to afford the desired porosity the plates are washed with water, and if desired the last portions of the acid can be neutralized with ammonia, after which the plates can be stored as well as the untreated plates heretofore employed.

In Fig. 9 we have shown another organized arrangement of cellulose fiber which may in some cases be employed. These consist of little snarled balls 9 of fibrous material, each of a thickness greater than that of the finished plate. The balls are mixed with the rubber or other composition which is made of such consistency as to penetrate the balls and embrace each fiber but not to penetrate into the fibers themselves. We prefer a rather coarser fiber than that of cotton, e. g. hemp or jute. When the blank is rolled out these are entirely covered and surrounded by composition as shown at 10, but when ground away on the sides as shown at 11 the fibers become open to the action of the solvent. These views as also Figs. 1, 2, 3, 4 and 8 are very much magnified above actual size since the thickness of the finished separator is seldom over $\frac{1}{16}$th inch.

It will be understood that many changes and variations can be made in our process and many substitutions and omissions without departing from our invention as defined in the annexed claims. It is particularly to be noted that some features of our invention can be taken and others left, and such features as are adopted can be utilized in connection with other procedures, wherefore we do not restrict ourselves in all cases to a complete following out of all the steps and principles herein described, but what we claim and desire to secure is limited only by the express terms of the claims annexed.

Having thus described our invention, what we claim is:

1. A battery separator containing flexible insoluble reinforcing fibres and flexible, porous, wick-forming fibres operatively combined together.

2. A battery separator comprising a textile fabric, consisting partly of threads which are more readily soluble in the electrolyte ingredients and partly of threads which are less readily soluble therein, the more insoluble threads being arranged to traverse and retraverse the thickness of the separator, and the body of the fabric being submerged in a rigid insoluble composition which embraces the threads, the loops of soluble threads being bare.

3. A battery separator containing animal fibers and vegetable fibers, the former affording strength and the latter porosity.

4. A battery separator comprising an insoluble supporting medium and threads surrounded and embraced thereby, said threads consisting in part of a substance which is insoluble in the ingredients of the electrolyte, and in part of a substance which is soluble in such electrolyte.

5. A battery separator comprising an insoluble supporting medium and threads immersed in and extending through said medium, said threads consisting in part of a mammalian hair like wool which is insoluble in sulphuric acid, and in part of a vegetable fiber like cotton which is both porous and soluble in sulphuric acid.

6. A battery separator comprising an insoluble supporting medium, and reinforcing threads submerged in said medium consisting largely of a mammalian hair like wool which is insoluble in sulphuric acid, together with other fibers which are soluble in sulphuric acid.

7. A battery separator comprising an insoluble supporting medium and a mixture of animal and vegetable fibers embraced thereby, whereby the animal fibers may remain to afford strength to the article after the disintegration of the vegetable fibers.

In testimony whereof, we hereunto affix our signatures.

WILLIAM H. WOOD.
HAROLD E. SMITH.